Patented Dec. 20, 1932

1,891,750

UNITED STATES PATENT OFFICE

FRANKLIN M. CORNELL, OF BROOKLYN, NEW YORK, ASSIGNOR TO STIMUPLANT LABORATORIES, INC., OF LONG ISLAND CITY, NEW YORK, A CORPORATION OF NEW YORK

BACTERIAL PRODUCT

No Drawing.  Application filed June 16, 1928.  Serial No. 286,061.

This invention relates to bacterial products useful in the inoculation of seeds or soils with bacterial, particularly *Bacterium radicicola*, in such manner that the bacteria will continue to vegetate and grow in conjunction with the plants resulting from said seeds or growing on said soil.

It has been the practice heretofore to produce bacterial cultures for soil or seed inoculation by treating humus or the like with the desired bacterial culture in liquid or jelly form, adding substances considered beneficial to the growth of the bacteria, adding sufficient water to bring the moisture content of the product to what was considered as the proper percentage for the continued growth of the organism and mixing thoroughly. The product is used by first wetting the seeds either with water or a dilute solution of sugar and then mixing with the bacterial product so that the product adheres to the seeds carrying the bacteria with it. It is then necessary to dry the seeds before planting.

The bacterial product or humus culture as made and used at present has the following disadvantages: The use of humus as a carrier introduces a great number and variety of undesired micro organisms into the product which micro organisms oftentimes retard or entirely prevent the growth of the desired bacteria. For this reason these undesired micro organisms are referred to as contaminating bacteria. The humus culture causes contaminating bacteria and fungi to continue to grow. Humus cultures as produced above do not adhere to seeds without additional treatment of the seeds or of the culture. Sterilization of humus before use in manufacturing a humus culture results in many cases in a chemical alteration of the humus in such manner that it causes contaminating organisms to grow more rapidly than otherwise. Moistening of seeds prior to inoculation necessitates in many cases the drying of the seeds before planting with consequent loss of time. Chemical action of added substances upon the complex mixture known as humus may result in the formation of substances of unknown chemical or bacteriological action, resulting in incon- stant hydrogen ion concentration of the product. Humus contains substances apparently acting as nutrients and whose chemical nature is not well understood. The variation in chemical composition from one sample of humus to another is too great to permit the maintenance of a predetermined standard of quality. Humus cultures as heretofore produced are therefore indefinite and inconstant in chemical composition and bacteriological action, cannot be sterilized to advantage and are inconvenient to use.

The product of this invention consists in general of ten types or classes of ingredients as follows:

1. An inert base.
2. A coloring material.
3. A bacterial culture produced in any suitable manner and containing the particular strain or variety or strains or varieties of the micro organism that is to grow in conjunction with the above mentioned plants.
4. A nutritive substance or substances for the purpose of keeping the bacteria alive over a period of time.
5. A substance or substances stimulative to the growth of said bacteria.
6. A substance or substances promoting or tending to promote the growth, multiplication, and functioning of the bacteria under adverse circumstances as in the presence of compounds of nitrogen.
7. A "buffer" substance or substances for the purpose of controlling the reaction or hydrogen ion concentration of the bacterial product.
8. A substance or substances for the purpose of causing the bacterial product to adhere to seeds without treatment with any additional substance.
9. A substance or substances for the purpose of preventing or inhibiting the growth of contaminating micro organisms.
10. A substance or substances permitting said bacteria to retain such characteristics and functions as they possess when growing in the soil or on plants growing in the soil.

The inert base or carrier consists essentially of a finely divided substance or mixture of substances of simple chemical composition, substantially sterile as produced or procured, not chemically altered by exposure to temperatures customarily used in sterilization, having no determinable effect by virtue of its chemical composition upon the micro organisms supported thereby and having no influence or a determinable influence upon the hydrogen ion concentration of the bacterial product. It is preferably, but not necessarily dark in color, of porous or absorbent nature, of such physical properties as will cause it to adhere to seeds and consisting of or containing a compound of silicon. The principal purpose of the inert base is to act as a carrier of the bacteria. Sand as ordinarily found is not sufficiently fine for use as a base.

The coloring material consists essentially of a black or dark colored substance or mixture of substances in a fine state of division, of simple chemical composition, substantially sterile as produced or procured, having no determinable effect by virtue of its chemical composition upon the micro organisms in the finished product, not chemically altered by exposure to temperatures ordinarily used in sterilization and having no influence or a determinable influence upon the hydrogen ion concentration of the resulting product. It is preferably but not necessarily of porous or absorbent nature. It is not necessarily of such physical properties as will cause it to adhere to seeds. Its main function is to act as a coloring matter when the product is applied to seeds so that one can differentiate between inoculated and uninoculated seeds. The product of this invention is a bacterial product containing a minimum of contaminating bacteria. In order to produce on a commercial scale a product having this highly desired characteristic it has been found of importance to use as a base and as a coloring material substances which may be procured or produced in a substantially sterile condition. Thus eliminating to a large extent the possibility of incorporating in the product an undesired amount of contaminating bacteria.

As the bacterial culture may be produced in any suitable manner the method of producing it does not constitute a feature of this invention.

The nutritive substance or mixture of nutritive substances is of such nature as will cause the bacteria to grow, multiply and retain the functions normally possessed by the bacteria when growing in conjunction with the plant whose seeds were inoculated therewith. It is of such nature that it will not react chemically with the inert base or the coloring material used. It is mainly for the purpose of keeping the bacteria alive over a period of time of not less than six months. It is preferably of such nature that it will act as a nutrient for contaminating micro organisms to a lesser extent than to the desired bacteria.

The substance or mixture of substances stimulative to the growth of the desired bacteria is mainly for the purpose of reducing the amount of bacterial culture ordinarily introduced into seed and soil inoculants. It must be of such nature and in such amount as will permit the bacteria to remain alive, functioning normally over a period of not less than six months. It is preferably of such chemical composition that it will not react chemically with any other constituent of the bacterial product. It is preferably of such nature that it will not stimulate the growth and functioning of contaminating micro organisms to the same or greater degree than it stimulates the growth and functioning of the desired bacteria.

The formation of nodules containing *Bacterium radicicola* upon the roots of leguminous and other plants has been found to be greatly inhibited by the presences of compounds of nitrogen. A substance or mixture of substances is therefore introduced for the purpose of promoting nodule formation in the presence of nitrogen compounds. The substance or mixture of substances must be of such nature that it is not injurious to the bacteria in the bacterial product or to the plants whose seeds are inoculated therewith.

The substance or mixture of substances for the purpose of controlling the reaction or hydrogen ion concentration of the bacterial product must be of such nature and in such amount that it will not be injurious to the desired bacteria nor to the seeds or plants to which the bacterial product is applied. It is preferably of such nature as will keep the reaction or hydrogen ion concentration of the bacterial product either at the optimum value for the growth of the desired bacteria or at such value as will permit the growth of the desired bacteria while inhibiting or preventing growth of any or all contaminating micro organisms.

The substance or mixture of substances for the purpose of causing the bacterial product to adhere to seeds must be of such nature as to have no injurious action upon the bacteria in the bacterial product or upon the plants or seeds to which the bacterial product is applied. It may be a liquid or powder and is preferably of simple chemical composition, not chemically altered by temperatures customarily used in sterilization and having no influence or a determinable influence upon the hydrogen ion concentration of the resulting product. It is preferably present in such amount as will cause the entire mixture used in the bacterial product to adhere to the seeds being inoculated without treatment of the seeds or of the bacterial product with any added substance.

The substance or mixture of substances permitting the desired bacteria to retain such characteristics and functions as they possess when growing in the soil or on plants growing in the soil is preferably of a siliceous nature. Its main purpose is the retention of virulence by the bacteria.

One instance of substances which may be used for the product is:

Inert base—Talc
Coloring material—Manganese dioxide
Nutritive substance—Maltose
Stimulant—Calcium carbonate
Substance improving resistance to nitrogen—Ammonium phosphate
"Buffer"—substance for controlling hydrogen ion concentration—Borax
Substance to adhere to seeds—Talc
Substance to prevent growth of contaminations—Copper sulphate
Substance to cause bacteria to retain growth and function as in soil—Talc These ingredients may be used in substantially the following proportions:

| | Parts by weight |
|---|---|
| Talc | 90 |
| Manganese dioxide | 10 |
| Maltose | 1 |
| Calcium carbonate | 5 |
| Ammonium phosphate | 1 |
| Borax | 1 |
| Copper sulphate | ½ |

Moisture—Approximately 25% of the total weight of the above ingredients.
Bacterial culture—Sufficient quantity.

Another and preferred instance of substances which may be employed for the product is:

Inert base—Kieselguhr or infusorial earth
Coloring material—Carbon black
Nutritive substance—Starch
Stimulants—Starch, calcium chloride
Resistant to nitrogen—Potassium alum
"Buffer" substance—Sodium bicarbonate
Substance to adhere to seeds—Kieselguhr
Substance to prevent growth of contaminations—Sodium bicarbonate
Substance to cause bacteria to retain functions as in soil—Kieselguhr These ingredients may be used in substantially the following proportions:

| | Parts by weight |
|---|---|
| Kieselguhr | 85 |
| Carbon black | 15 |
| Starch | 8 |
| Calcium chloride | 1 |
| Potassium alum | ½ |
| Sodium bicarbonate | 1 |

Moisture—Approximately 25% of the total weight of the above ingredients.
Bacterial culture—Sufficient quantity.

Any or all of the ingredients as obtained may be tested by appropriate bacteriological, chemical, or physical tests to determine their suitability for use in the bacterial product. Any or all of the ingredients with the single exception of the bacterial culture may be brought to sterile conditions at any time prior to addition of the bacterial culture.

The above mentioned ingredients may be mixed or ground together in any suitable manner and added to the particular batch of bacterial product being manufactured, in any satisfactory manner, and in suitable proportion, the method of manufacture described below being preferred.

The inert base, the coloring material, the substance or mixture of substances for causing the product to adhere to seeds and the substance or substances for the purpose of causing the bacteria to retain their normal functions, are added in powdered form to a suitable mixing machine and are mixed thoroughly. To this mixture are added the nutritive substance or substances, the substance or substances stimulative to the growth of the desired bacteria, the substance or substances promoting the growth of the bacteria under adverse circumstances as in the presence of nitrogen compounds, the "buffer" substance or substances for controlling the hydrogen ion concentration of the product and the substance or substances for the purpose of preventing or inhibiting the growth of contaminating micro organisms.

All of the above substances are preferably in the form of more or less dry powders. The entire mass of ingredients thus far added is sufficiently mixed and to the mixture are added sufficient bacterial culture and water in proper amount to bring the moisture content of the bacterial product to what is deemed to be a satisfactory percentage. What is a satisfactory percentage for any batch of the product is determined by the product characteristics desired as the water content exerts a marked influence on the virulence and duration of life of the desired bacteria. Usually the water content of the product is around 25 percent. The mixing is continued until the ingredients of the bacterial product are thoroughly mixed and the product assumes a more or less homogeneous appearance.

While certain preferred embodiments of the invention have been described it will be understood that it may be embodied in other forms, that substances other than those specifically mentioned may be used and changes may be made in the relative proportions of the ingredients without departing from the invention as defined in the appended claims.

What I claim is:

1. A bacterial product containing *Bacterium radicicola*, kieselguhr, carbon black, starch, calcium chloride, potassium alum and sodium bicarbonate.

2. A bacterial product containing *Bacterium radicicola*, kieselguhr substantially 85 parts by weight, carbon black substantially 15 parts by weight, a starch substantially 8 parts by weight, calcium chloride substantially 1 part by weight, potassium alum substantially one-half of 1 part by weight, sodium bicarbonate substantially 1 part by weight and moisture constituting approximately 25 percent of the total weight of the above named ingredients.

3. A bacterial product in powder form containing *Bacterium radicicola*, an inert silicious base, a carbohydrate bacteria food, said product also containing calcium chloride to stimulate the growth of the bacteria, potassium alum to promote the growth and functioning of the bacteria under adverse circumstances and sodium bicarbonate for controlling the hydrogen ion concentration of the bacterial product.

In testimony whereof I affix my signature.

FRANKLIN M. CORNELL.